US008210746B2

(12) United States Patent
Kerr et al.

(10) Patent No.: US 8,210,746 B2
(45) Date of Patent: Jul. 3, 2012

(54) BAG AND ARTICLE OF MANUFACTURE

(75) Inventors: George Scott Kerr, Mason, OH (US); Lawrence Andrew Schumacher, Trenton, OH (US); Barry Stanley Shantz, Cincinnati, OH (US); David P Cameron, Canandiagua, NY (US); Roger B Fielder, Shreveport, LA (US)

(73) Assignee: The Procter & Gamble Company, Cincinnati, OH (US)

( * ) Notice: Subject to any disclaimer, the term of this patent is extended or adjusted under 35 U.S.C. 154(b) by 644 days.

(21) Appl. No.: 12/360,294

(22) Filed: Jan. 27, 2009

(65) Prior Publication Data

US 2009/0154845 A1 Jun. 18, 2009

Related U.S. Application Data

(63) Continuation-in-part of application No. 12/221,166, filed on Jul. 31, 2008.

(60) Provisional application No. 60/962,979, filed on Aug. 2, 2007.

(51) Int. Cl.
*B65D 33/16* (2006.01)

(52) U.S. Cl. .......... 383/67; 383/203; 383/120; 383/104; 383/207; 383/78; 383/61.1; 383/61.2; 383/61.3; 383/61.5

(58) Field of Classification Search .................. 383/203, 383/67.1, 67.2, 67.3, 120, 104, 207, 78, 67, 383/61.1, 61.2, 61.3, 61.5

See application file for complete search history.

(56) References Cited

U.S. PATENT DOCUMENTS

| 3,069,066 | A | | 12/1962 | Peckham |
| 4,816,104 | A | | 3/1989 | Benoit |
| 5,456,928 | A | * | 10/1995 | Hustad et al. .................. 426/87 |
| 2003/0215163 | A1 | | 11/2003 | Schneider et al. |

(Continued)

FOREIGN PATENT DOCUMENTS

DE 202004006856 U1 7/2004

(Continued)

OTHER PUBLICATIONS

PCT International Search Report Dated Mar. 18, 2010—5 pgs.

*Primary Examiner* — Michael C Miggins
(74) *Attorney, Agent, or Firm* — Amy M. Foust; Adam W. Borgman

(57) ABSTRACT

Disclosed is an article of manufacture including bag having a front surface; a rear surface; two side surfaces each having a gusset therein and connecting the front and rear surfaces; a flattenable bottom surface formed by connecting the front, rear, and side surfaces; and a top surface formable by connecting the front, rear, and side surfaces. The bag has a height, a width, and a depth, and defines an internal volume. The bag is sealable and has a seal strength of at least about 1,600 pounds per square inch. The bag is formed from a plastic laminate having a thickness of from about 130 to about 200 microns and a tensile strength of at least about 3,400 pounds per square inch. The article of manufacture also includes at least about 15 pounds of a particulate, flowable composition contained therein. The bag can also have a closure system comprising a non-reusable closure and a reusable closure. Also included are methods, using the article of manufacture, of enhancing palatability of an oxidizable, particulate, flowable composition contained therein.

47 Claims, 7 Drawing Sheets

U.S. PATENT DOCUMENTS

| | | |
|---|---|---|
| 2004/0120613 A1 | 6/2004 | Hanson |
| 2004/0136622 A1* | 7/2004 | Shigeta et al. ................. 383/120 |
| 2005/0254731 A1* | 11/2005 | Berbert et al. .................... 383/7 |
| 2007/0230833 A1 | 10/2007 | Winiecki |
| 2009/0136163 A1* | 5/2009 | Kerr et al. ..................... 383/120 |

FOREIGN PATENT DOCUMENTS

| | | |
|---|---|---|
| WO | WO 03/010057 A1 | 2/2003 |
| WO | WO 03010057 A1 * | 2/2003 |
| WO | WO 2005/113357 A | 12/2005 |

* cited by examiner

BAG AND ARTICLE OF MANUFACTURE

CROSS REFERENCE TO RELATED APPLICATIONS

This application is a continuation-in-part of prior U.S. application Ser. No. 12/221,166, filed on Jul. 31, 2008; which claims the benefit of U.S. Provisional application 60/962,979, filed on Aug. 2, 2007, which is hereby incorporated by reference herein in its entirety.

FIELD OF THE INVENTION

The invention relates generally to bags for containing particulate, flowable compositions, particularly large, heavy bags containing particulate, flowable compositions. More particularly, the invention relates to bags and closure systems for such bags wherein the bags and closure systems can withstand a drop or fall from at least about 4 feet without bursting or breaking open. Most particularly, the invention relates to bags for containing from about 15 to about 75 pounds of particulate, flowable composition.

BACKGROUND OF THE INVENTION

Industries that use and sell large quantities of bulk, particulate, flowable compositions such as animal food, bulk foods, coffee, fertilizer, detergent and the like are often faced with the task of packaging and shipping such compositions in containers suitable for shipping, handling, retail sale, and consumer transport and use. For compositions such as bulk animal foods, such containers are typically paper or plastic bags containing up to about 75 pounds of food composition. Such containers therefore, must be able to withstand shipping and handling without breaking open.

Bags for containing and handling bulk compositions are made from various materials and secured closed in various ways depending on the properties of the bag materials, the properties of the closure systems, and cost considerations. Materials used for such bags include burlap, paper, multi-layer, and plastics including nylon, and woven polypropylene. Closure for one-time use can be accomplished by stitching, taping, gluing, heat sealing, and/or ultra sonic welding the containers closed after the containers are filled with the composition. The cost to produce such bags and closures varies with the type of bag material and type of closure used. In the retail pet food industry such bags have typically been made from multiple layers of paper, plastic, and/or foil, and stitched, taped, heat sealed and/or ultrasonically welded closed.

The materials and closures of such bags are typically selected to provide the most cost-effective container, considering material cost, material properties, closure cost, closure properties, damage and lost product due to bag breakage, etc. Bags for containing quantities of 15 or more pounds of dry pet food composition are typically multiple layered paper bags, often lined with plastic or foil on an interior surface thereof, that are stitched, taped and/or glued closed.

However, paper bags do not keep the food compositions contained therein particularly fresh over time. Oxygen, moisture, and even perhaps organisms can enter the bags. Thus, in time, the food may oxidize, become stale, become infested, and generally become less palatable to the animal and less desirable by the animal owner. Additionally, bags that are stitched, taped and/or glued closed can not be resealed once opened. Therefore, many animal owners resort to emptying the contents of the paper bag into a storage container that can be easily accessed, easily reclosed, and that keeps the food fresh.

Furthermore, such feed bags are typically rectangularly shaped with very small depth versus height of such bags. Thus, the bags must be stacked and displayed laying flat on one of the largest surfaces, usually the front or back surface. Such orientation, particularly for bags containing 15 or more pounds of composition, makes the bags difficult to display, and to remove and lift. If such bags are successfully removed from a store shelf, they are often deposited on a narrow bottom surface of the bag, and often fall over. The instability of the bags can be bothersome if one must keep righting the bag. In addition, if the bag has been taken home and opened, extensive spillage can result when the bag tips over.

Recently, manufacturers have attempted to provide bags that are reclosable and that provide enhanced spoilage protection for the contents over time, such that a user does not have to empty a large, heavy bag into a separate container. Therefore, manufacturers have begun to supply plastic bags, or paper bags with plastic or foil linings, and having reclosable features. Plastic, and plastic or foil lined materials are better moisture and air/oxygen barriers than for example, paper or burlap, and provide better protection from spoilage and infestation.

However, it has been found that many such plastic bags burst open, when filled with about 15 or more pounds of bulk composition, and dropped off of a truck, a store shelf, out of a user's vehicle or grip, or when tipped over. The bursting problem is often exacerbated when such bags are formed with a reclosable feature. Such bags can burst at the site of the reclosable feature or at one or more seals or seams of the bag, or the material forming the bag itself can tear and cause the bag to burst open. In addition, plastic bags can be slippery to the touch, and can result in a greater amount of bags dropped versus other materials such as paper, nylon or burlap.

Some manufactures have attempted to solve the problem of bags bursting at a reclosable feature by placing and sealing a material over or across the reclosable feature, which the consumer then removes once the bag is safely at its final destination. Such an approach is feasible with various paper bags, and quantities of composition over about 15 pounds in weight. However, many plastic bags still burst when they contain over about 15 pounds of material and fall from a height of about 3 feet, whether or not the bags contain a reclosable feature. Thus, the majority of bags used for containing greater than about 15 pounds of dry pet food are various types of paper bags. Other approaches include sealing the inside of the bag in addition to having a recloseable feature. Using a double thickness in the reclosable feature is another option. However, cost can increase prohibitively as more components are added to the bag.

Therefore, there is a need for a plastic bag that can contain amounts of heavy compositions and can withstand a drop from various heights without bursting open. There is also a need for such a bag to be reclosable. There is a need for such a bag to also provide moisture and oxidation barrier protection for the contents. There is also a need for the bag to be stable when situated upright on a bottom surface of the bag, and for the bag to be easily grippable.

SUMMARY OF THE INVENTION

The present invention relates to articles of manufacture comprising bags for containing large quantities of particulate, flowable compositions such as dry pet foods; and methods of preserving and enhancing palatability of oxidizable, particulate, flowable compositions such as dry pet foods. The bags of the present invention are burst-resistant when containing at least about 15 pounds of a particulate, flowable composition and dropped from a height of at least about 4 feet, and are proportioned so as to be stable and resistant to tipping when placed on a bottom surface thereof. The bags can be reclosable. Such articles, bags, and methods reduce bag damage and product loss during shipping and handling, enable the bags to be displayed and sold in a more-easily visible and liftable orientation, and enable a user to avoid having to transfer the contents of the bag to a second container for use of the composition.

DETAILED DESCRIPTION OF THE INVENTION

All measurements made herein art made at 25° C. unless otherwise designated.

The term "particulate, flowable compositions", as used herein and usable with the present invention, means compositions including animal feeds including rodent, dog, cat, horse, goat, cattle, pig, bird, and the like; detergents; fertilizers; cat litter; bulk foods including grains, nuts, beans, fruits and the like.

The term "slack fill", as used herein, means to fill a container with a composition during manufacturing and/or packaging such that the composition occupies a volume less than the interior volume of the container, thereby leaving a "head space", meaning empty portion of volume, in the container.

The term "seal", as used herein, means the seal(s) that form the bag itself, and which are formed by sealing the inner surfaces of the plastic laminate together; and in addition mean the seals formed when sealing a non-reusable closure to the top of the bag, if such a non-reusable closure is used.

The term "seal strength", as used herein, refers to a measure of tensile strength at each seal made and used in forming the bag.

Article of Manufacture
Bag

Figure 1:
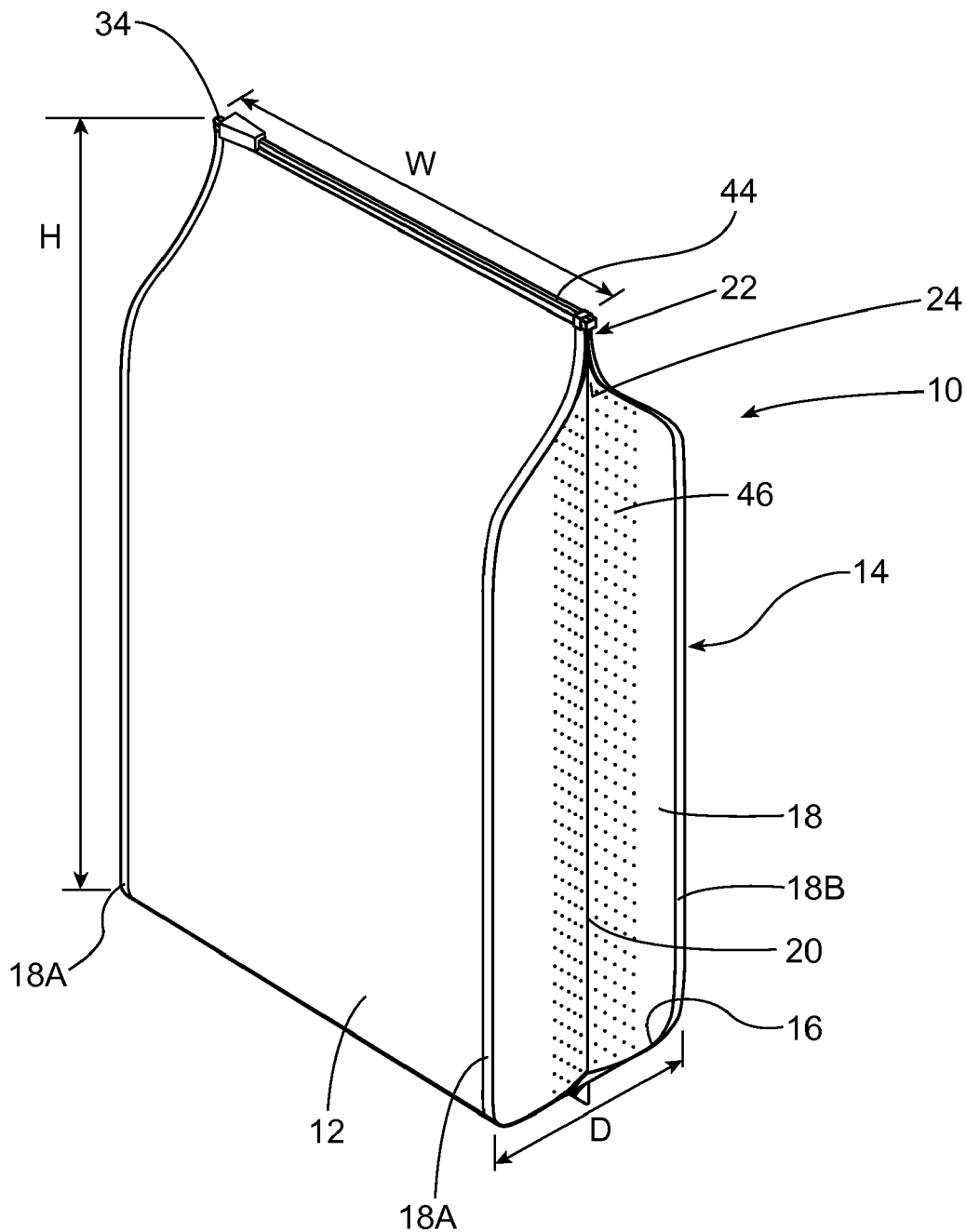
FIG. 1 is a perspective view of a bag of the present invention.
Figure 2:
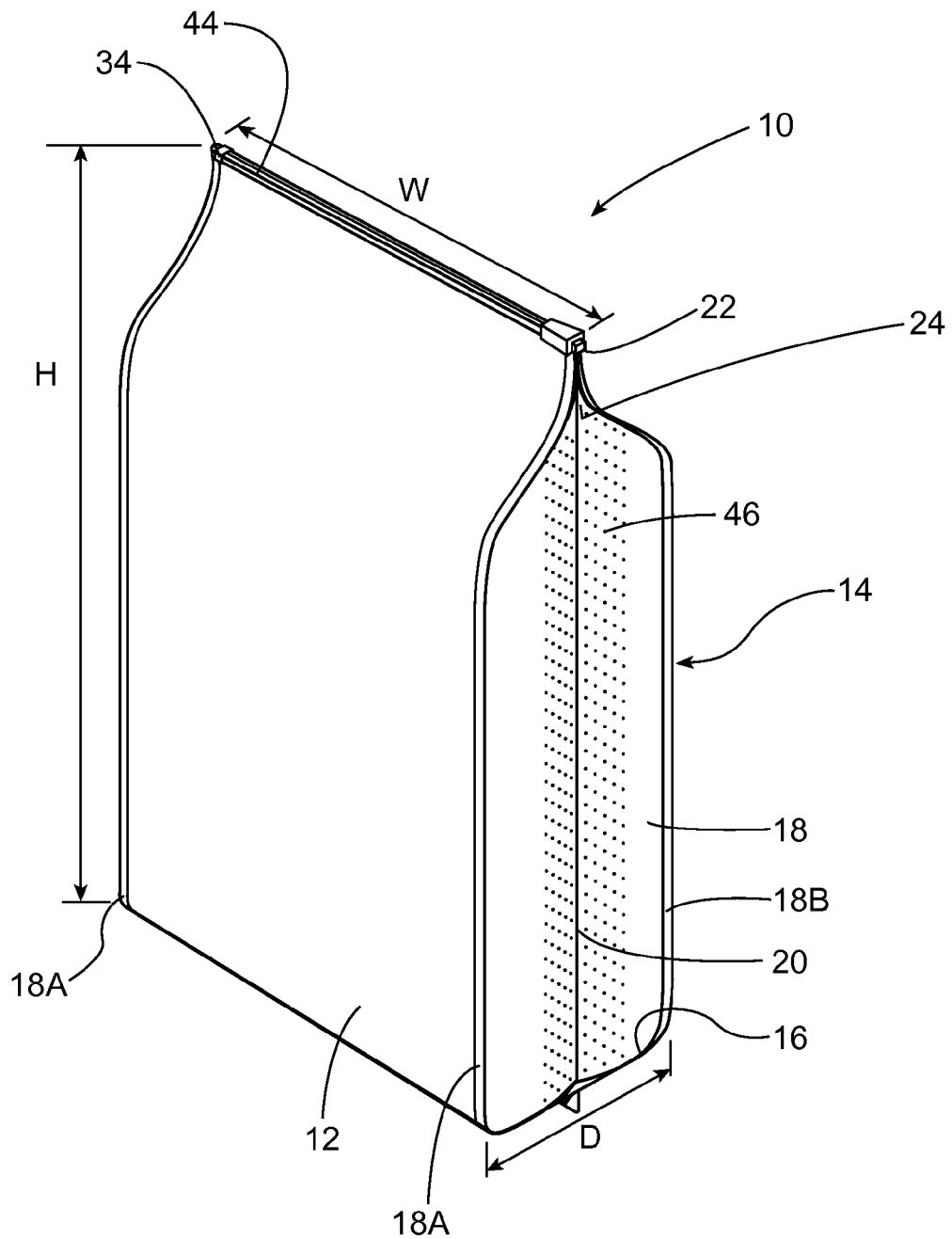
FIG. 2 is a perspective view of an alternative embodiment of the present invention.

The present invention encompasses articles of manufacture illustrated in FIGS. 1-7. As shown in FIGS. 1 and 2, the article of manufacture comprises a bag 10 comprising a front surface 12 and a rear surface 14 extending upwardly from a flattenable bottom surface 16. Two side surfaces 18 each have an expandable gusset 20 therein connecting front surface 12 and rear surface 14 at opposite sides of bag 10. The bag 10 also has a flattenable bottom surface 16 that can be formed by connecting front surface 12, rear surface 14 and side surfaces 18. Bag 10 also has a top surface 22 formable by connecting front surface 12, rear surface 14, side surfaces 18, and located opposite flattenable bottom surface 16. The bag has a height H, a width W, a depth D. The height H, width W, and depth D of bag 10 are defined and measured as internal dimensions of bag 10, measured from the inside surfaces of the bag. The height H is measured along the front or rear face of the bag from the inside edge of the bottom seal to the top edge of the bag, not including any closure. The width is measured across the front or rear face of the bag from inside of edge seal to inside of edge seal at a midpoint of the height of the bag. The depth is measured across either side gusset from edge seal to edge seal at a midpoint of the height of the bag. The height H, width W, and depth D define an internal volume V.

The bag 10 is sealable, by methods commonly known in the art, such as for example, heat sealing, along at least one edge of a side surface 18a, 18b, bottom surface 16 and top surface 22. The bag can also be sealed at each edge 18a, 18b. Such a bag, sealed at each of the four side edges is referred to as a "quad seal" bag. A quad seal bag is a preferred embodiment described herein. The seals of the bag have a seal strength of at least about 1,600 pounds per inch (lbf/in.). The bag comprises a plastic laminate having a thickness of from about 130 to about 200 microns. The plastic laminate has a tensile strength of at least about 3,400 pounds per inch (lbf/in.).

The article of manufacture comprises, in addition to the bag, at least about 15 pounds of a particulate, flowable composition contained therein. Alternatively, the article of manufacture comprises at least about 20 pounds of the particulate, flowable composition, alternatively at least about 30 pounds of the particulate, flowable composition, and alternatively at least about 40 pounds of the particulate, flowable composition. The article of manufacture can comprise up to about 75 pounds of particulate, flowable compostion.

The bag 10 of the article of manufacture of the present invention is formed to have particular dimentions and a particular shape. An embodiment of bag 10 of the present invention, as shown in FIGS. 1 and 2, has a ratio of width W to height H of from about 0.4 to about 0.8. Alternatively, the ratio of width W to height H is about 0.6. Such a ratio of width W to height H helps to ensure that bag 10 is stable and resistant to tipping such that bag 10 can be easily placed and stored on its bottom surface 16. Furthermore, such a width W to height H ratio distributes forces generated on the plastic laminate and seals if the bag is dropped, such that the width W to height H ratio aids in making the bag resistant to breaking or bursting if dropped.

Bag 10 also has a ratio of depth D to height H of from about 0.2 to about 0.4. Alternatively bag 10 has a depth D to height H ratio of from about 0.2 to about 0.3. The depth D is provided by side gussets 20. The depth D to height H ratio also aids in ensuring that bag 10 can be easily placed and stored on its bottom surface 16, and be resistant to tipping. In addition, the depth D to height H ratio also helps distribute forces generated on the plastic laminate and seals if bag 10 is dropped, such that the depth D to height H ratio aids in making bag 10 resistant to breaking or bursting if dropped.

Such ratios are not commonly found in commercially available bags. Most commercially available side gusseted bags have rather small side gussets, and thus, very small depth to height ratios. Such small depth to height ratios result in bags that have small bottom surfaces, and which effectively can not be stood on the bottom surface without tipping over. Therefore, conventional pet feed bags must be displayed laid down on either the front or rear surface, and can not effectively be used throughout the period of use of the composition contained therein because they do not stand up well. In addition plastic laminate bags with small side gussets are much less burst-resistant due to the small surface area of the sides having the gussets. When such bags are dropped, particularly on the small, gusseted sides, they are likely to burst due to the forces created due to the small surface area of the gusseted sides.

Therefore, an example combination of ratio of width W to height H, and ratio of depth D to height H, of a bag of the present invention, is about 0.6 and about 0.25. A bag 10 of the present invention, when formed as described, can withstand a drop from at least about 4 feet, on one of gusseted sides 18, when filled with at least about 15 pounds of particulate, flowable composition, and is very stable and resistant to tipping. Thus, such a bag can be displayed and sold in an upright, vertical position, and can be easily used as the storage container for the composition contained therein, throughout the use of the composition.

Figure 3:
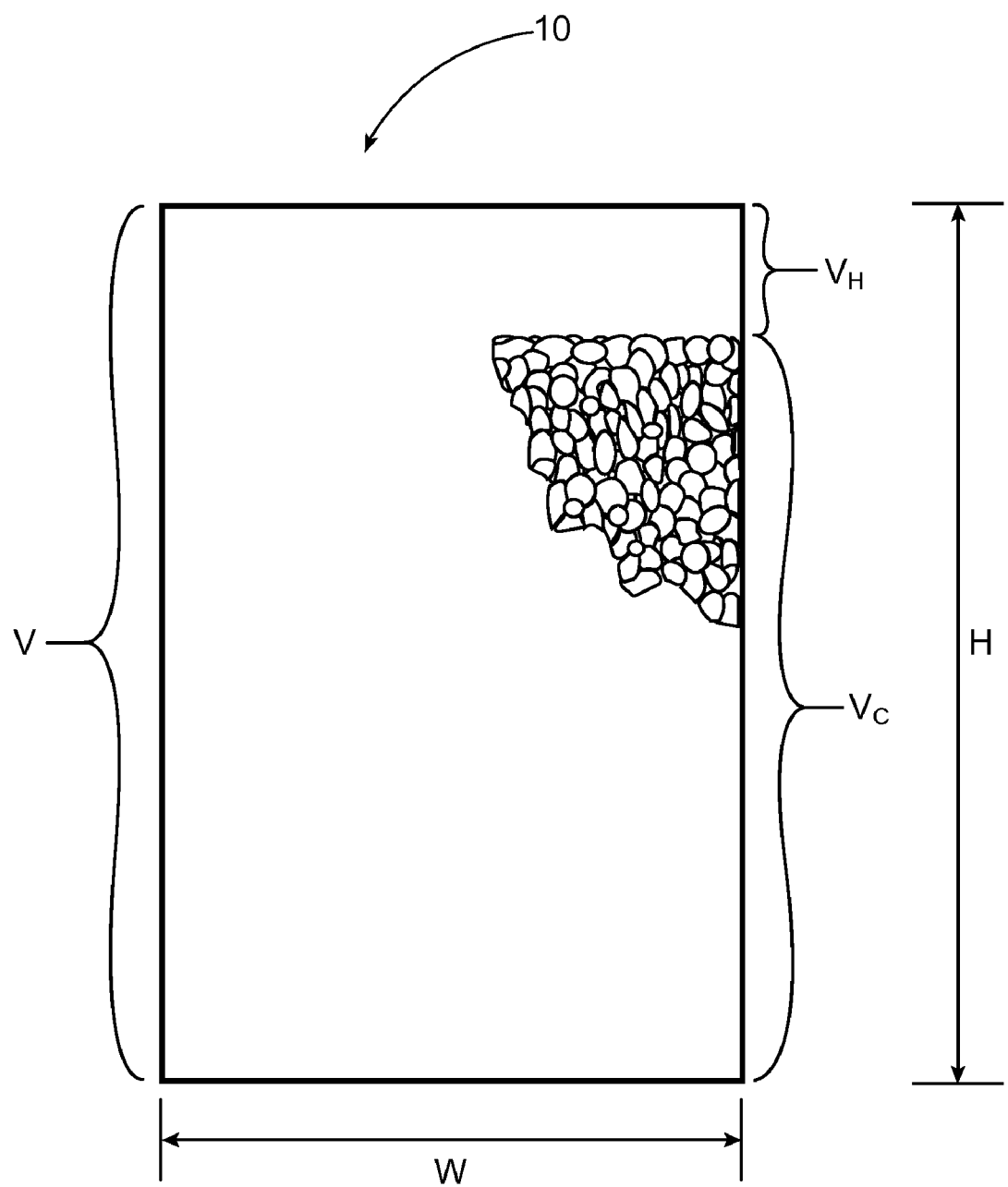
FIG. 3 is a perspective cutaway view showing a bag of the present invention filled with particulate, flowable compostion.

As shown in FIG. 3, bag 10 of the present invention also defines an internal volume V which is at least about 20% greater than a volume Vc occupied by the composition contained within bag 10, thus creating a head space volume Vh. The bags are slack filled such that the composition does not occupy the entire internal volume V of the bag. The 20% head space volume Vh allows bag 10 to be easily and securely sealed after filling, helps to distribute forces generated if bag 10 is dropped to help ensure bag 10 is burst resistant, and, in combination with the depth D and gussets 20, provides a grippable portion 24, as seen in FIGS. 1 and 2 near the top surface 22 by which bag 10 can be grasped for lifting.

Figure 4:
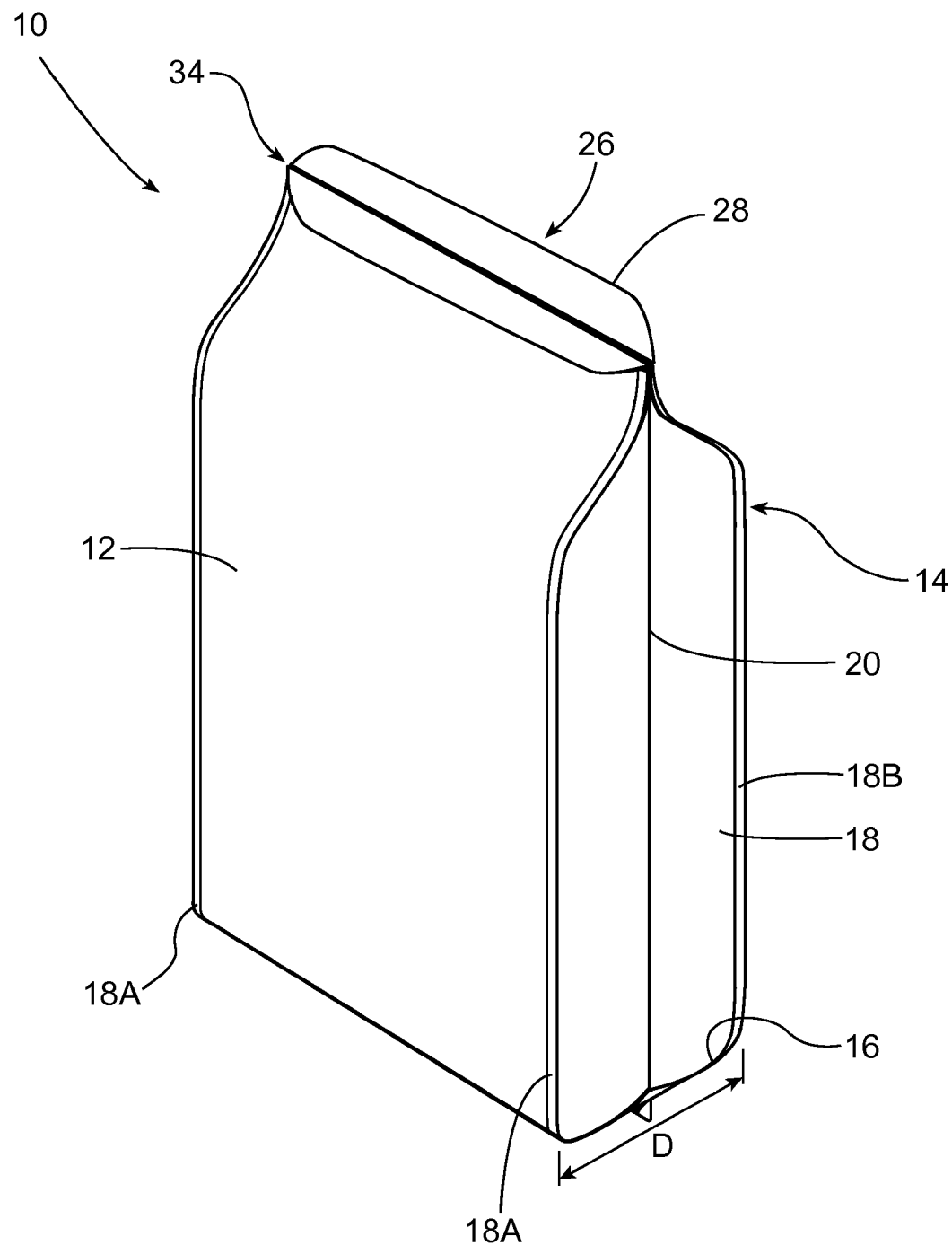
FIG. 4 is a top perspective view of a bag illustrating a non-reusable closure of the present invention.

An embodiment of bag 10 can comprise a non-reusable closure 26, shown in FIG. 4, that can aid in ensuring bag 10 is burst resistant and can provide a tamper evident indicator. Non-reusable closure 26 has a length that extends along said width W of bag 10. Non-reusable closure 26 comprises a membrane 28 connectable between front surface 12 and rear surface 14 of bag 10. The membrane 28 has a thickness of from about 170 to about 200 microns. Non-reusable closure 26 is installed in bag 10 in the machine direction of the material of membrane 28.

Membrane 28 has a user-facing surface 30, and a tear strength of at least about 15 pounds per inch (lbf/in.), as measured in the transverse or cross machine direction, by ASTM Method D-882 Standard Test Method for Tensile Properties of Thin Plastic Sheeting. Non-reusable closure 26 can be disposed at a top edge 34 of bag 10, or alternatively, can be disposed inboard a distance from top edge 34 of bag 10. In FIG. 4, non-reusable closure 26 is shown located at top edge 34 of bag 10.

Figure 5:
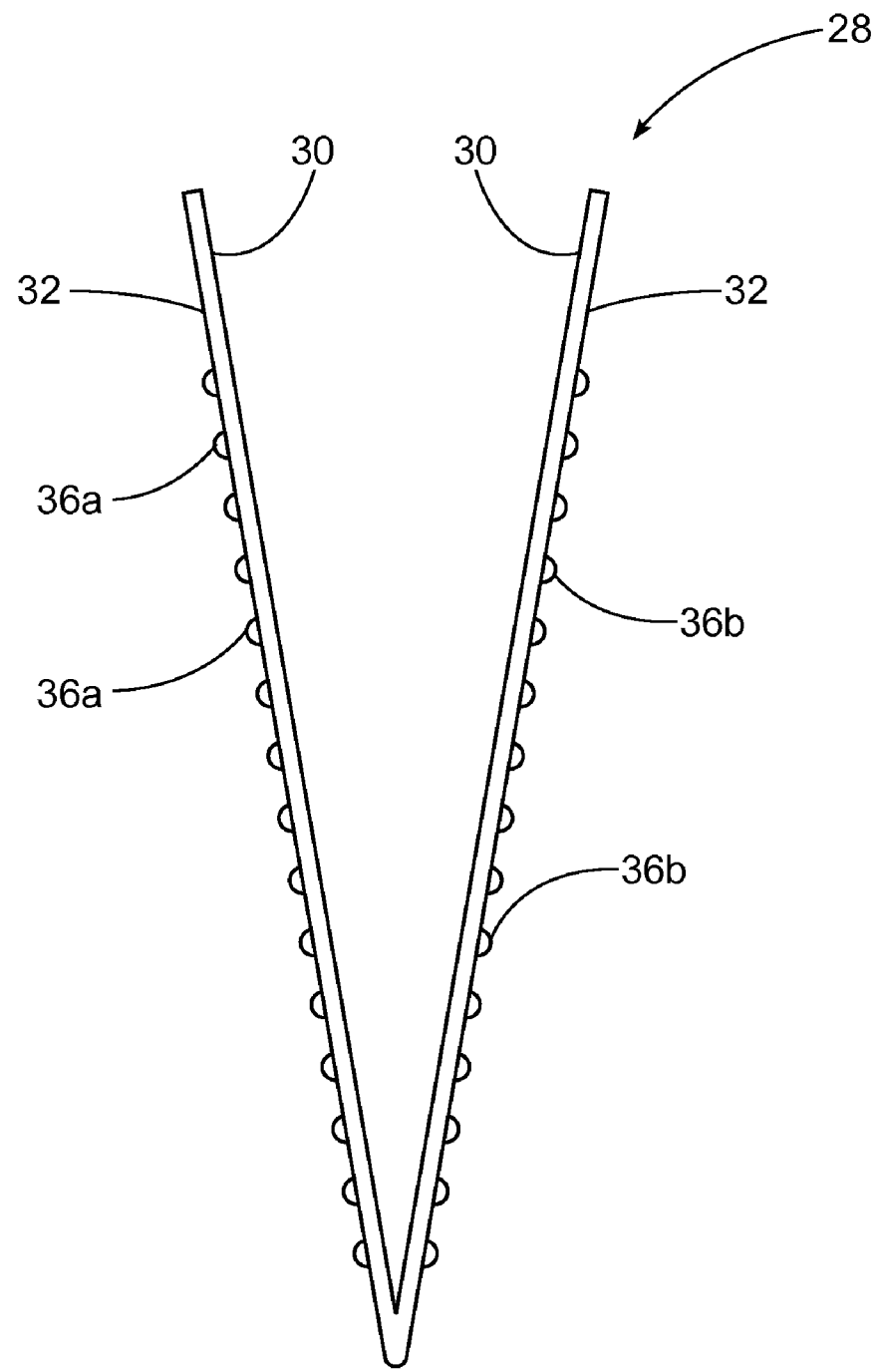
FIG. 5 is a cross-sectional side view of the membrane of the invention.

As shown in FIG. 5, membrane 28 has a plurality of ribs 36a on outer surface 32 of membrane 28 which enable outer surface 32 to be sealable to front surface 12 of bag 10, and a plurality of ribs 36b on outer surface 32 of membrane 28 which enable outer surface 32 to be sealable to rear surface 14 of bag 10 to seal bag 10 closed.

Figure 6:
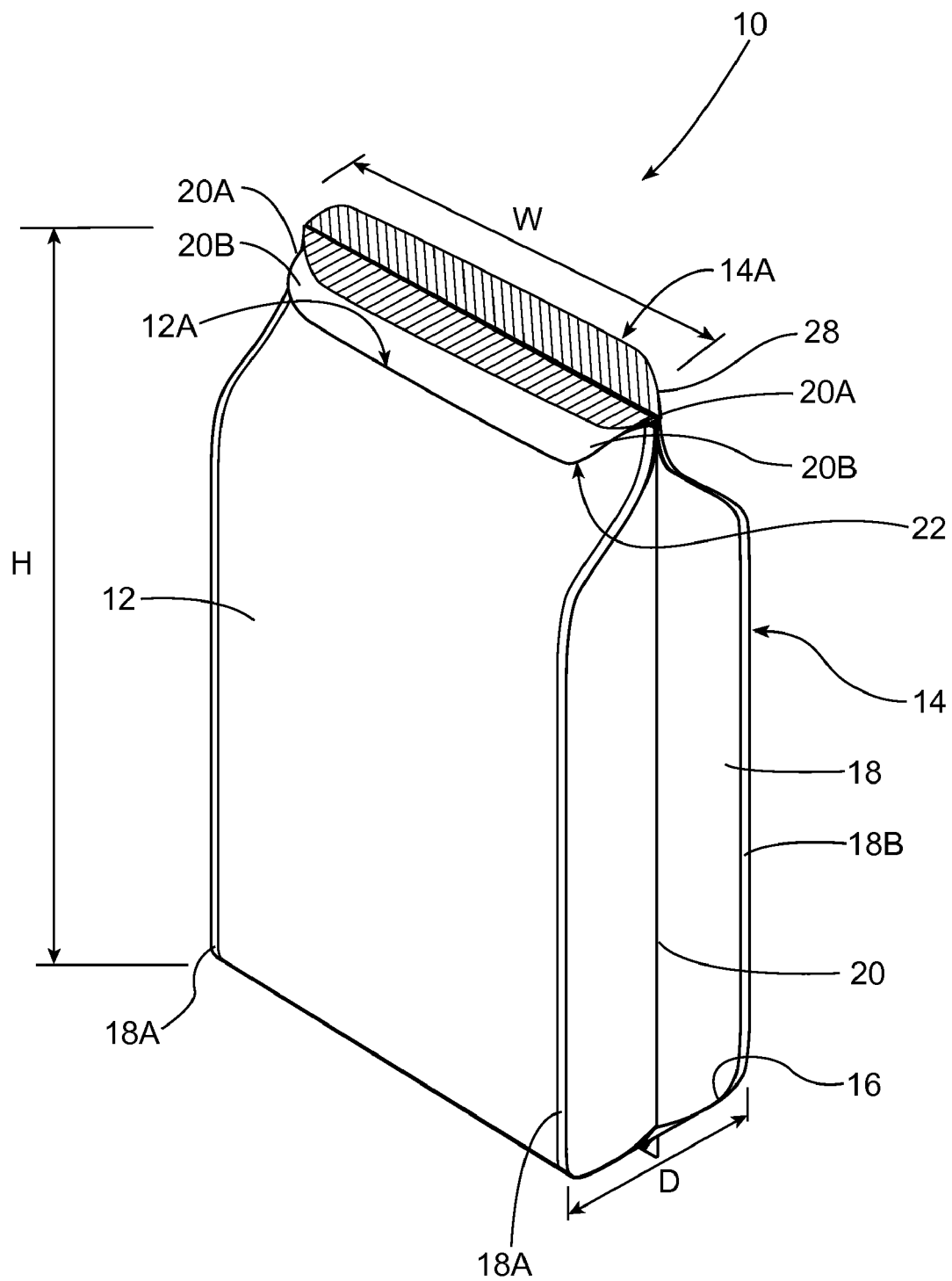
FIG. 6 is a perspective view of a bag having a non-reusable closure partially installed therein.

FIG. 6 illustrates a membrane 28 partially installed on a bag 10. A plurality of ribs 36a (as shown in FIG. 5) on outer surface 32 of membrane 28 is sealable to an inner surface 12a of front surface 12 and to a top portion 20a of an inner surface 20b of gussets 20. A plurality of ribs 36b on outer surface 32 of membrane 28 is sealable to an inner surface 14a of rear surface 14 and to a top portion 20a of an inner surface 20b of gussets 20. When membrane 28 is sealed to bag 10, the seal captures the top portion 20a of gussets 20 as well as front and back surfaces 12 and 14. Such a seal can be accomplished by methods commonly known in the art, such as, for example, heat sealing.

When the article of manufacture is being manufactured, bag 10 is formed, the top portion thereof open. Ribs 36a of outer surface 32 of membrane 28 can then be sealed to inner surface 12a of front surface 12 and top portions 20a of gussets 20. The bag 10 is filled, and then ribs 36b of outer surface 32 can be sealed to inner surface 14a of rear surface 14 and top portions 20a of gussets 20 to seal bag 10 closed and form top surface 22.

Such a closure allows for top filling of bags. However, such a closure could also be completely installed at the top of the bag, and form the top surface 22, before filling and be used with a bottom fill process without having the closure break or burst during the bottom fill process.

Although membrane 28 provides excellent burst resistance, a tear strength of greater than about 15 pounds per inch (lbf/in.) proves difficult for a user to open by hand. Because it is desired that the article of manufacture of the present invention also be easy for an ultimate consumer or user to open by hand, membrane 28 comprises a targeted opening region 38. Targeted opening region 38 has a tear strength, measured in the transverse or cross machine direction by ASTM Method D-882, of from about 1 to about 15 pounds per inch (lbf/in.), alternatively of from about 3 to about 12 pounds per inch (lbf/in.), alternatively from about 4 to about 10 pounds per inch (lbf/in.), alternatively from about 4 to about 9 pounds per inch (lbf/in.), and alternatively from about 5 to about 7 pounds per inch (lbf/in.).

During development of the bag of the present invention, it was found that known non-reusable closures and tamper evident features have opening regions that extend the entire length of the membrane, i.e. essentially the entire width of the bag. Such opening regions typically consist of one or more score lines, perforations or other material-weakening features. However, it was found that such opening regions, while being easily opened by a consumer, by hand, also become a region of weakness and bursting when bags filled with for example, 15 or more pounds of dry pet food, are dropped, sometimes from as low as 18 inches. Such drops are common in the shipping and handling of large, heavy bags containing various particulate, flowable compositions and cause damage and loss of product, and annoyance to retailers and consumers.

Figure 7A:
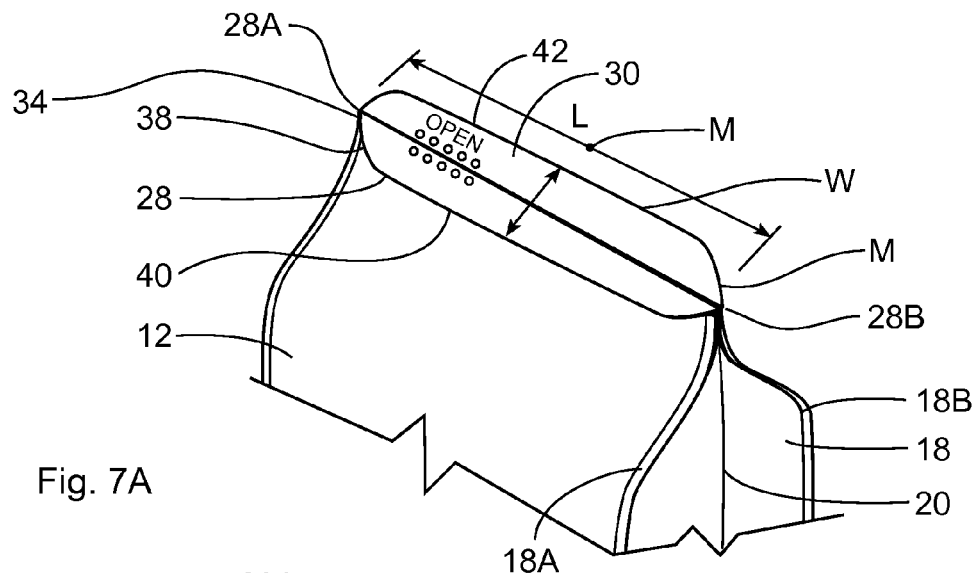
FIGS. 7a-c are perspective views of the non-reusable closure of the present invention illustrating the targeted openable region.
Figure 7B:
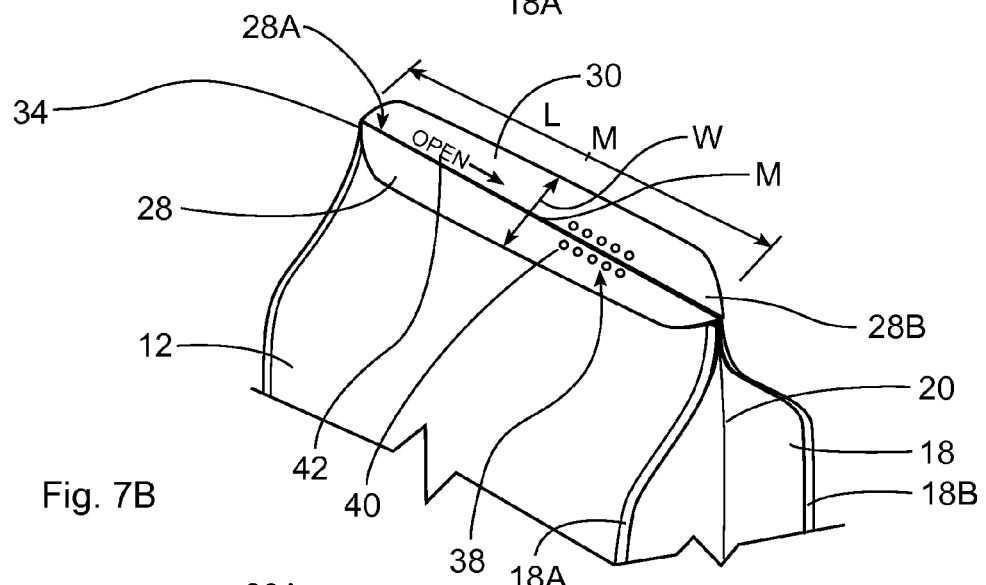
Figure 7C:
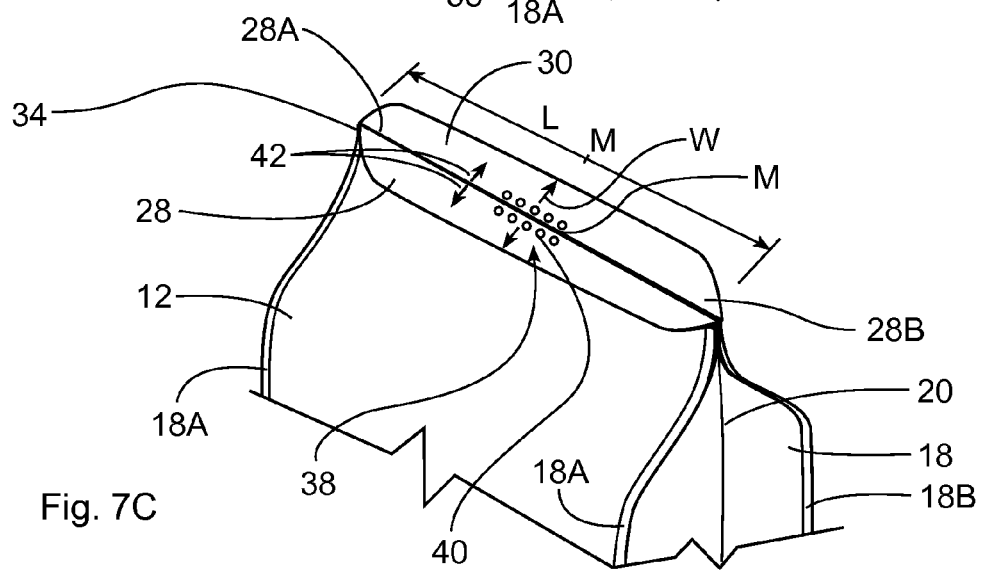

Therefore, the burst-resistant bag 10 of the present invention comprises targeted opening region 38 that comprises from about 1% to about 90% of a length L of membrane 28. Alternatively targeted opening region 38 comprises from about 1% to about 50% of the length L of membrane 28, alternatively from about 1% to about 30% of the length L of membrane 28, and alternatively of from about 1% to about 10% of the length L of membrane 28. Furthermore, it was found that when the opening region extends to, or is located within, about 5% of either end 28a, 28b of the length L of membrane 28, even if the opening region only comprises a small percentage, for example about 10-20%, of the length L of membrane 38, burst resistance is decreased. Thus, even small opening regions, when located at the end(s) 28a, 28b, of membrane 28, decrease burst resistance. Therefore, the "targeted opening region" 38 of the present invention means, and has the proviso that, the opening region does not extend to within about 5% of either end 28a, 28b of membrane 28. Targeted opening region 38 can be located anywhere along the length L of membrane 28, within the definition of the targeted opening region, or can be centered at a midpoint M along the length L of membrane 28 and width W of bag 10. Targeted opening region 38 is located at or near a midpoint m of the width w of membrane 28, and is disposed inboard a distance from top edge 34 of bag 10. FIGS. 7a-c illustrate various locations and sizes of targeted opening region 38.

As can be seen in FIGS. 7a-c, targeted opening region 38 can comprise a plurality of perforations 40 in membrane 28. Targeted opening region 38 can also comprise and be formed by laser scoring, heat scoring, or mechanical weakening of any type such as removing a portion of material.

Also shown in FIGS. 7a-c, membrane 28 can also comprise instructional indicia 42 on user-facing surface 30 of membrane 28. Such instructional indicia 42 can comprise printing including words, pictures, symbols, illustrations, and the like, to indicate to the user where and how to open the non-reusable closure 26.

Membrane 28 can be formed from a material selected from the group consisting of ethylene derived polymer, polypropylene, polyester, polyolefins, homopolymer and/or co-polymer polyolefins, and combinations thereof.

Particularly, membrane 28 can comprise an ethylene-derived polymer selected from the group consisting of low density polyethylene, high density polyethylene, ultra-low density polyethylene, and combinations thereof. The particular combination of material is selected based on balancing strength of the material for burst resistance with openability for ease of use of the bag 10. The material is also devised and formed based on its ability to seal securely to the plastic laminate of bag 10 to provide the required seal strength of at least about 1,600 pounds per square inch. The material of the membrane can be a co-extruded blend of low density polyethylene, high density polyethylene, and ultra low/very low density polyethylene, with ultra low/very low density polyethylene forming ribs 36a and 36b such that the ribs seal to the inner surfaces of the bag at a temperature of less than about 68° C. The number of ribs 36a, 36b can depend on the width w of the membrane. The spacing of the ribs 36a, 36b on membrane 28 can depend on the type and strength of seal desired.

In addition to finding a particular material for the membrane 28 that provides burst resistance and allows for openability, the dimensions of membrane 28 are important with respect to burst resistance, seal strength, ease of sealing during manufacturing, and openability. Membrane 28 has a width w of from about 1.5 inches to about 3 inches. Alternatively, membrane 28 has a width of from about 2 inches to about 3 inches. Alternatively, membrane 28 has a width of about 3 inches. When the total width w of the membrane 28 is about 3 inches, there can be about ten to fifteen (10-15), alternatively about fourteen (14) ribs 36a, 36b outer surface 32, as illustrated previously in FIG. 5.

Production and creation of the particular plastic laminate of the present invention proved challenging. Although plastic laminates are known, it proved difficult to construct an appropriate laminate. Bags containing particulate, flowable compositions are often dropped during shipping and handling. Conventional, commercially available such bags often burst when dropped from a height of as low as 18 inches, when filled with as little as 15 pounds of composition. Such bursting causes damage and lost product as well as messes and annoyance to retailers and consumers. In particular, bags that have reclosable features tend to burst at the site of the reclosable feature. Thus, currently available resealable feed bags are generally not available in capacities greater than about 15 pounds, and/or have the reclosable feature taped over, or otherwise additionally reinforced.

When bags containing large amounts of particulate, flowable compositions burst, several elements of the bag can fail. If the bag has a reclosable feature, the forces generated by a drop of the bag can cause the composition contained therein to burst through the reclosable feature. The seals which form the bag can separate and fail. The material from which the bag itself is made, for example, the plastic laminate, can tear or burst open. The material from which the laminate is made, as well as the thickness of the laminate affect its burst resistance.

Therefore, it was necessary to create an appropriate laminate having a balance of strength and stretchability (measured by tensile strength), flexibility and stiffness (measured by secant modulus), texture, thickness, and cost-effectiveness. Particular laminates may have a high tensile strength, and therefore a high resistance to stretching, which is useful to some degree. However, such a laminate may be brittle or stiff (i.e. have a high secant modulus), and because it resists stretching, may burst easily, and therefore would not be useful in bags of the present invention. However, other laminates that may be very stretchable (i.e. have a low tensile strength), and therefore, resistant to bursting, would also not be suitable, because such a laminate may result in bulges or unsightly deformations after shipping, handling, and likely dropping. In addition, a laminate usable with the present invention must also have a suitable texture, and not be too slippery. Bags containing at least about 15 pounds of a particulate, flowable composition can be difficult to pick up and carry because of the weight of material contained therein. Thus, bags containing such materials should ideally not be slippery or hard to grip.

In addition, the laminate must be securely sealable to form the bag, by methods known the art such as heat sealing. The laminate must be cost-effective as well, and plastic laminate bags are more costly than traditional paper feed bags. Thus, as thin a layer of laminate as possible is desired. However, the thickness of the laminate in combination with its composition affects its likelihood to burst if dropped. Thus, material composition and thickness must be considered.

Bag 10 of the present invention therefore has a seal strength of at least about 1,600 pounds per square inch as measured by ASTM Method D-882. Alternatively, bag 10 has a seal strength of at least about 1,800 pounds per square inch.

The plastic laminate forming the bag has a tensile strength of at least about 3,400 pounds per square inch as measured in both the machine and transverse or cross machine directions by ASTM Method D-882. Alternatively, the plastic laminate has a tensile strength of at least about 3,500 pounds per square inch, and alternatively of at least 3,800 pounds per square inch.

The plastic laminate of the bag has a secant modulus of from about 50,000 to 110,000 pounds per square inch, as measured in both the machine and transverse or cross machine directions by ASTM Method D-882.

Bag 10 can be formed from a plastic laminate selected from the group consisting of ethylene-derived polymer, polypropylene, polyester, teraphthalates, polyolefins, homopolymer and or co-polymer polyolefins, woven polypropylene, and combinations thereof. More particularly, the plastic laminate can be selected from the group consisting of ethylene-derived polymers such as polyethylenes in combination with teraphthalates such as polyethylene teraphthalate (PET). In order to be sealable to itself and to the material of a non-reusable closure, if one is employed, the material of the inner surface of the laminate has a relatively low melting point such that it melts to enable heat sealing, whereas the outer surface has a higher melting point such that it does not melt during heat sealing. Thus, an outer layer can be polyethylene teraphthalate (PET), and an inner layer can be a co-extruded blend of linear low density polyethylene, medium density polyethylene, and linear low density polyethylene. As used herein the densities of polyethylene, "low", "medium", "high", "ultra low/very low", have meanings as used and understood in the art for such materials.

The plastic laminate has a thickness of from about 130 to about 200 microns. Alternatively, the plastic laminate has a thickness of from about 140 to about 170 microns.

In addition to aiding in enabling bag 10 to be burst-resistant, the plastic laminate must provide oxygen and moisture barrier properties. It has been shown that plastic is a better oxygen and moisture barrier than traditional paper for pet foods. It has also been shown that fats, carbohydrates, proteins, and other components commonly found in pet foods oxidize over time when exposed to air. Furthermore, it has been shown in palatability tests that animals prefer, over time, food stored in plastic bags versus that stored in paper bags. Thus, the articles of manufacture of the present invention also provide enhanced palatability of the oxidizable compositions contained therein.

Therefore, a preferred plastic laminate has an oxygen transmission rate of less than about 6.5 cc/100 in$^2$/24 hours, as measured by ASTM Method D-3985, and alternatively of less than about 6.2 cc/100 in$^2$/24 hours. A preferred plastic laminate also has a moisture vapor transmission rate of less than about 0.1 grams/100 in$^2$/24 hours, when measured by ASTM Method F-1249, and alternatively of less than about 0.8 grams/100 in$^2$/24 hours.

In another embodiment of the present invention, as shown in FIGS. 1 and 2, bag 10 can further include a reusable closure 44. As described above, the dimensions and proportions of bag 10 are such that they provide burst resistance and enhanced stability. Thus, bag 10 is stable when placed on bottom surface 16. The plastic laminate also provides oxygen and moisture barrier properties to enable the composition to be stored in bag 10 over time. Therefore, providing a reusable closure enables the end user consumer to simply use bag 10 itself as the storage device for the composition.

Non-limiting examples of reusable closures of the present invention include a track and a slider system, a plastic zipper, a metal zipper, a hook and loop fastening system, a threaded closure device, a pressable sealing device, a snap sealing device, resealable adhesive, magnetic sealing device, electrostatic sealing device, and combinations thereof.

Reusable closure 44 is disposable at top edge 34 of bag 10, as shown in FIGS. 1 and 2. Alternatively, reusable closure 44 is disposable a distance inboard from top edge 34 of said bag.

In another embodiment of the present invention, bag 10 can comprise both a non-reusable closure and a reusable closure.

As described above, bag 10 is not only burst-resistant but stable as well, such that it can be used as a reusable storage container. As described above the proportions and dimensions of bag 10 provide stability. Therefore, bag 10 has a tip angle of from about 10° to about 50°, and alternatively has a tip angle of from about 20° to about 30°. Tip angle is measured using ASTM Method 6179.

Bag 10 should also be provided with a means for equalizing air pressure within the bag, to assist in providing burst resistance and to provide an appealing visual appearance to the bag. However, such means for equalizing air pressure must also prevent infestation, i.e. prevent undesirable organisms form entering the bag.

Air pressure equalization means can allow air to escape from and enter bag 10. It is important to allow air to escape from bag 10 during shipping and handling of the bags. When bags are stacked on pallets for shipping, the weight of the bags on top of each other can cause the bags to burst if there is no way for air to escape from the bags. However, once air is squeezed out of the bags, the bags can have an unappealing, 'vacuum packed', lumpy appearance. Thus, it is desirable to allow air back into the bags once the bags are unloaded for display and sale.

Air pressure equalization can be accomplished by providing a plurality of perforations 46 in at least one side of bag 10, for example in each side gusset 20 as shown in FIGS. 1 and 2. Perforations 46 can be less than about 90 micrometers in diameter, and alternatively less than about 70 micrometers in diameter, in order to allow air to pass therethrough but prevent infestation.

In addition, one or more gaps (not shown) can be provided at a seal of the bag, for additional passage of air. The gap(s) can be formed by interrupting the heat sealing process, and such seals are known in the art as "skip gap" seals. To form such a 'skip gap seal' a non-continuous seal bar can be used, i.e. a seal bar having one or more gaps thereon wherein the gapped part of the seal bar would not touch the material being sealed, thus leaving an unsealed portion or "gap". Such a 'skip gap seal' can be formed on the seal formed at the bottom of the bag, at the seal formed when attaching a first portion of the membrane to the front surface of the bag, or when attaching the second portion of the membrane to the rear surface of the bag. A 'skip gap seal' can be formed, for example in the final seal sealing the bag closed once it has been filled. Each gap can be of from about 70 µm to about 10 mm in length. If no non-reusable closure is used, gap(s) can be formed in any of the seals used to form the bag, as required for appropriate, desired air equalization.

The gap(s) can be straight sided, and have a cylindrical or tubular shape, or can be shaped and/or curved and of a length that would still allow air to pass therethrough, but which would provide a barrier to infestation (i.e. provide a longer, more complicated path for potentially infesting organisms). Any shaped gap can be incorporated or formed into the seal bar of the heat sealing apparatus, as would be understood by those skilled in the art.

Method of Enhancing Palatability

The present invention also includes methods of enhancing palatability of an oxidizable particulate, flowable composition after storage comprising the steps of:
  a. providing a plastic laminate bag comprising:
    i.) two side surfaces each having a gusset therein and connecting the front and rear surfaces;
    ii.) a closure system comprising a reusable closure and a non-reusable closure,
  wherein said non-reusable closure comprises a membrane having a targeted opening region, the targeted opening region having a tear strength of from about 4 to about 10 pounds per inch (lbf/in.);
  wherein the plastic laminate has a predetermined oxygen transmission rate and a predetermined water vapor transmission rate;
  b. filling the plastic laminate bag with at least about 15 pounds of an oxidizable, particulate, flowable composition;
  c. sealing the plastic laminate bag closed; thereby preventing oxidation and spoilage and enhancing the palatability of the composition contained therein.

The plastic laminate usable with the method has an oxygen transmission rate of less than about 6.5 cc/100 in$^2$/24 hours, alternatively less than about 6.2 cc/100 in$^2$/24 hours. The oxygen transmission rate is measured, as described above, by ASTM Method D-3985. The plastic laminate has a moisture vapor transmission rate of less than about 0.1 grams/100 in$^2$/24 hours, alternatively less than about 0.8 grams/100 in$^2$/24 hours. The moisture vapor transmission rate is measured, as described above, by ASTM Method F-1249.

EXAMPLES

ASTM Method 5276-98 (Reapproved 2004) "Standard Test Method for Drop Test for Loaded Containers by Free Fall" contains provisions for dropping variously shaped containers to assess various parameters such as finding an average drop height to failure, or for attaining pass/fail data. Bags of the present invention are subjected to these tests from heights of up to 6 feet, as a specification for shipping and handling requirements.

See in particular sections A1.1, A1.3. When testing bags of the present invention, the test is a pass/fail test because required drop heights are specified. Based on experience packaging, shipping, and handling such bags, a specification is set that such bags containing at least about 20 pounds of particulate, flowable material, must pass a free fall drop from at least about 6 feet. When the bags contain at least about 40 pounds of particulate, flowable material, they must pass a free fall drop from at least about 4 feet. Failure occurs if any of the seals of the bag, any closures (whether reusable or non-reusable), or the bag material tears, splits, separates, punctures, deforms, bulges, and/or leaks.

The apparatus used for such a drop conforms to section 5 of ASTM Method 5276-98. Specifically the apparatus used is a L.A.B. Model 160A Drop Tester. The bags can be dropped on each of the six surfaces of the bag, and in particular must pass the drop test from the given drop height on at least one of the side surfaces. Single drops are performed, as in section A2.2.1, and drops on all six surfaces are performed, as in section A2.2.8. In particular, drops are performed on one or both of the two side surfaces, as in section A2.2.10, because the two side surfaces are those determined most likely to fail. The impact surface is concrete, as specified in section 5.1.5.1, and complies with sections 5.1.5.3-5. When the bags are dropped on each surface, they are dropped such that the drop complies with sections 8.4.1-8.5.

Example 1

A bag of the present invention can be constructed as follows.

A plastic laminate film, comprising a 12 micron thick layer of polyethylene teraphthalate ("PET") bonded by adhesive lamination to a 140 micron thick co-extruded layer of metallocene linear low density polyethylene, medium density polyethylene, and metallocene linear low density polyethylene, (available for example from Exopack, Spartanburg, S.C., USA) is used for forming the bag. Once the bag is formed, the co-extruded polyethylene layer forms the inner surface and the PET layer forms the outer surface of the bag.

The sides of the bag are gusseted. The two edges of each side gusset on each side of the bag are sealed to form two edge seals on each side, resulting in four edge (4) seals, thus forming a "quad seal" bag The bag is sealed at the bottom by conventional heat sealing, capturing the bottom of the side gussets therein and forming a bottom surface. The side gussets are also sealed at the bottom of f the bag with a "K-seal" as is known in the art, to allow the bottom surface to be flattenable.

A non-reusable closure membrane formed from a blend of low density polyethylene and ultra low density polyethylene is attached, by co-extrusion therewith, to a track of a slider and track zipper, for example a Slide-Rite® zipper from Pactiv Corp., Lake Forest, Ill., USA. A track of a slider track zipper device is formed of high density polyethylene. The track further comprises materials such as, but not limited to, low density polyethylene and cyclic olefins. The track and the membrane are co-extruded. The membrane has a width w of about 3 inches as measured from inner edge to inner edge of the track. The membrane has a targeted opening region of 1.5 inches in length, disposed along the length of the membrane, and formed from a plurality of perforations. The targeted opening region is formed centered at a midpoint m of the width w of the membrane, and centered at a midpoint M of the length L of the membrane. See FIG. 7C. The targeted opening region has a tear strength (as measured by ASTM Method D-882) of between about 5-7 pounds per inch (lbf/in.).

The non-reusable closure membrane attached to the reusable track and slider closure is attached by heat sealing one side of the outer surface of the membrane to an inner surface of the front surface of the bag. The inner and outer surfaces of one half of each side gusset are captured by the seal. The bag is filled with 20 pounds of dry pet food. With the dimensions described herein, 20% headspace is provided and results in 5.5 inches of bag height remaining above the height of the product, which enables proper sealing of the bag. The second side of the outer surface of the membrane of the non-reusable closure is then heat sealed to the inner surface of the rear surface of the bag to close the bag. The inner and outer surfaces of the other half of each side gusset are captured by the final seal.

The bag has a height of 25 inches, a width of 13.25 inches, and a depth of 6.5 inches. Height dimensions have a tolerance of about 0.12 inches. Width dimensions have a tolerance of about 0.25 inches. Depth dimensions have a tolerance of 0.6 inches. The ratio of width to height is 0.6. The ratio of depth to height is 0.25.

A bag as described in this example will pass a drop test conducted according to ASTM Method D-5276-98 (Reapproved 2004) Standard Test Method for Drop Test of Loaded Containers by Free Fall, when dropped on any and all six surface, particularly the two side surfaces, from a height of 6 feet when filled with 20 pounds of dry dog food.

Example 2

An alternative embodiment of a bag of an article of manufacture of the present invention can be made as follows.

A plastic laminate film, comprising a 12 micron thick layer of polyethylene teraphthalate ("PET") bonded by adhesive lamination to a 165 micron thick co-extruded layer of metallocene linear low density polyethylene, medium density polyethylene, and metallocene linear low density polyethylene, (available for example from Exopack, Spartanburg, S.C., USA). is used for forming the bag. Once the bag is formed, the co-extruded polyethylene layer forms the inner surface and the PET layer forms the outer surface of the bag.

The sides of the bag are gusseted. The two edges of each side gusset on each side of the bag are sealed to form two edge seals on each side, resulting in four edge (4) seals, thus forming a "quad seal" bag. The bag is sealed at the bottom by conventional heat sealing, capturing the bottom of the side gussets therein and forming a bottom surface. The side gussets are also sealed at the bottom of the bag with a "K-seal" as is known in the art, to allow the bottom surface to be flattenable.

A non-reusable closure membrane formed from a blend of low density polyethylene and ultra low density polyethylene is attached, by co-extrusion therewith, to a track of a slider and track zipper, for example a Slide-Rite® zipper from Pactiv Corp., Lake Forest, Ill., USA. A track of a slider track zipper device is formed high density polyethylene. The track and the membrane are co-extruded. The membrane has a width w of about 3 inches as measured from inner edge to inner edge of the track. The membrane has a targeted opening region of 1.5 inches in length, disposed along the length of the membrane, and formed form a plurality of perforations. The targeted opening region is formed centered at a midpoint m of the width w of the membrane, and centered at a midpoint M of the length L of the membrane. See FIG. 7C. The targeted opening region has a tear strength (as measured by ASTM Method D-882) of between about 5-7 pounds per inch (lbf/in.).

The non-reusable closure membrane attached to the reusable track and slider closure is attached by heat sealing one side of the outer surface of the membrane to an inner surface of the front surface of the bag. The inner and outer surfaces of one half of each side gusset are captured by the seal. The bag is filled with 40 pounds of dry pet food. With the dimensions described herein, 20% headspace is provided and results in 5.5 inches of bag height remaining above the height of the product, which enables proper sealing of the bag. The second side of the outer surface of the membrane of the non-reusable closure is then heat sealed to the inner surface of the rear surface of the bag to close the bag. The inner and outer surfaces of the other half of each side gusset are captured by the final seal.

The bag has a height of 29 inches, a width of 17.5 inches, and a depth of 7.25 inches. Height dimensions have a tolerance of about 0.12 inches. Width dimensions have a tolerance of about 0.25 inches. Depth dimensions have a tolerance of 0.6 inches. The ratio of width to height is 0.6. The ratio of depth to height is 0.25.

A bag as described in this example will pass a drop test conducted according to ASTM Method D-5276-98 (Reapproved 2004) Standard Test Method for Drop Test of Loaded Containers by Free Fall, when dropped on any and all six surfaces, particularly the two side surfaces, from a height of 4 feet when filled with 40 pounds of dry dog food.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An article of manufacture comprising:
   a.) A bag comprising:
      i.) a front surface;
      ii.) a rear surface;
      iii.) two side surfaces connecting said front and said rear surfaces, each side surface having a gusset therein;
      iv.) a flattenable bottom surface formed by connecting said front, said rear and said side surfaces; wherein the bag can stand on the bottom surface without tipping over;
      v.) a top surface formable by connecting said front, said rear and said side surfaces; and
      vi.) a non-reusable closure comprising a membrane having a targeted opening region, said targeted opening region having a tear strength of from about 1 to about 15 pounds per inch, and
   b.) at least 15 pounds of a particulate, flowable composition contained within said bag.

2. The article of manufacture of claim 1 wherein said bag contains at least about 20 pounds of said particulate, flowable composition.

3. The article of manufacture of claim 1 wherein said targeted opening region comprises from about 1% to about 90% of a length of said membrane.

4. The article of manufacture of claim 1 wherein said non-reusable closure is disposed at a top edge of said bag.

5. The article of manufacture of claim 1 wherein said non-reusable closure is disposed inboard a distance from a top edge of said bag.

6. The article of manufacture of claim 1 wherein said bag has a tip angle of from about 10° to about 50°.

7. The article of manufacture of claim 1 wherein said composition comprises a dry pet food.

8. The article of manufacture of claim 1 wherein said bag comprises a width, a height, a depth, and an internal volume.

9. The article of manufacture of claim 8 wherein said bag has a ratio of said width to said height of from about 0.4 to about 0.8.

10. The article of manufacture of claim 8 wherein said bag has a ratio of said depth to said height of from about 0.2 to about 0.4.

11. The article of manufacture of claim 8 wherein said bag has a ratio of said width to a height of from about 0.4 to about 0.8, and a ratio of said depth to said height of from about 0.2 to about 0.4.

12. The article of manufacture of claim 8 wherein said internal volume of said bag is at least about 20% greater than a volume occupied by said composition contained within said bag.

13. The article of manufacture of claim 12 wherein said internal volume, said depth of said bag, and said gussets, in combination form a grippable portion near said top of said bag, by which said bag can be grasped for lifting.

14. The article of manufacture of claim 8 wherein said non-reusable closure has a length that extends along said width of said bag.

15. The article of manufacture of claim 1 wherein said non-reusable closure comprises a membrane connectable between said front surface and said rear surface of said bag, said membrane having a user-facing surface and an outer surface.

16. The article of manufacture of claim 15 wherein a portion of said outer surface of said membrane is sealable to said front surface of said bag, and portion of said outer surface of said membrane is sealable to said rear surface of said bag.

17. The article of manufacture of claim 16 wherein said targeted opening region comprises a plurality of perforations in said membrane.

18. The article of manufacture of claim 16 wherein said targeted opening region is centered at a midpoint along a width of said bag.

19. The article of manufacture of claim 15 wherein said membrane comprises instructional indicia on said user-facing surface thereof.

20. The article of manufacture of claim 15 wherein said membrane has a width of from about 1.5 inches to about 3 inches.

21. The article of manufacture of claim 1 further comprising a reusable closure.

22. The article of manufacture of claim 21 wherein said reusable closure is selected from the group consisting of: a track and a slider system, a plastic zipper, a metal zipper, a hook and loop fastening system, a threaded closure device, a pressable sealing device, a snap sealing device, resealable adhesive, a magnetic device, an electrostatic device, and combinations thereof.

23. The article of manufacture of claim 21 wherein said reusable closure is disposable at a top edge of said bag.

24. The article of manufacture of claim 21 wherein said reusable closure is disposable a distance inboard from a top edge of said bag.

25. An article of manufacture for containing a flowable particulate composition comprising:
   a. A burst-resistant bag comprising:
      i.) a front surface;
      ii.) a rear surface;
      iii.) a flattenable bottom surface; wherein the bag can stand on the bottom surface without tipping over;
      iv.) two side surfaces each having a gusset therein;
      v.) a top surface; and
      vi.) a closure system comprising a non-reusable closure and a reusable closure, wherein said non-reusable closure comprises a membrane having a targeted opening region, said targeted opening region having a tear strength of from about 1 to about 15 pounds per inch;
      vii.) wherein said bag is sealable and has a seal strength of at least about 1,600 pounds per square inch, and wherein said bag comprises a plastic laminate having a thickness of from about 130 to about 200 microns and a tensile strength of at least about 3,400 pounds per square inch; and
   b. at least about 15 pounds of a flowable particulate composition contained within said bag.

26. The article of manufacture of claim 25 wherein said bag contains at least about 20 pounds of said particulate, flowable composition.

27. The article of manufacture of claim 25 wherein said non-reusable closure has a length that extends along said width of said bag.

28. The article of manufacture of claim 25 wherein said targeted opening region comprises from about 1% to about 90% of the length of said membrane.

29. The article of manufacture of claim 25 wherein said targeted opening region comprises a plurality of perforations in said membrane.

30. The article of manufacture of claim 25 wherein said targeted opening region is centered at a midpoint along a width of said bag.

31. The article of manufacture of claim 25 wherein said membrane comprises instructional indicia on said user-facing surface thereof.

32. The article of manufacture of claim 25 wherein said membrane has a width of from about 1.5 inches to about 3 inches.

33. The article of manufacture of claim 25 wherein said non-reusable closure is disposed at a top edge of said bag.

34. The article of manufacture of claim 25 wherein said non-reusable closure is disposed inboard a distance from a top edge of said bag.

35. The article of manufacture of claim 25 wherein said reusable closure is selected from the group consisting of: a track and a slider system, a plastic zipper, a metal zipper, a hook and loop fastening system, a threaded closure device, a pressable sealing device, a snap sealing device, resealable adhesive, a magnetic device, an electrostatic device, and combinations thereof.

36. The article of manufacture of claim 25 wherein said reusable closure is disposable at a top edge of said bag.

37. The article of manufacture of claim 25 wherein said reusable closure is disposable a distance inboard from a top edge of said bag.

38. The article of manufacture of claim 25 wherein said bag has a tip angle of from about 10° to about 50°.

39. The article of manufacture of claim 25 wherein said bag comprises a width, a height, a depth, and an internal volume.

40. The article of manufacture of claim 39 The bag of claim 1 wherein said bag has a ratio of said width to said height of from about 0.4 to about 0.8.

41. The article of manufacture of claim 39 wherein said bag has a ratio of said depth to said height of from about 0.2 to about 0.4.

42. The article of manufacture of claim 39 wherein said bag has a ratio of said width to a height of from about 0.4 to about 0.8, and a ratio of said depth to said height of from about 0.2 to about 0.4.

43. The article of manufacture of claim 39 wherein said internal volume of said bag is at least about 20% greater than a volume occupied by said composition contained within said bag.

44. The article of manufacture of claim 39 wherein said internal volume, said depth of said bag, and said gussets, in combination form a grippable portion near said top of said bag, by which said bag can be grasped for lifting.

45. The article of manufacture of claim 25 wherein said membrane of said non-reusable closure is connectable between said front surface and said rear surface of said bag, said membrane having a user-facing surface and an outer surface.

46. The article of manufacture of claim 45 wherein a portion of said outer surface of said membrane is sealable to said front surface of said bag, and portion of said outer surface of said membrane is sealable to said rear surface of said bag.

47. The article of manufacture of claim 45 wherein said composition comprises a dry pet food.

* * * * *